(12) United States Patent
Dawson et al.

(10) Patent No.: US 11,236,703 B2
(45) Date of Patent: Feb. 1, 2022

(54) DUAL STAGE CATALYTIC THRUSTER

(71) Applicant: Aerojet Rocketdyne, Inc., Sacramento, CA (US)

(72) Inventors: Matthew Dawson, Seattle, WA (US); Gerald Brewster, Sammamish, WA (US)

(73) Assignee: Aerojet Rocketdyne, Inc., Redmond, WA (US)

( * ) Notice: Subject to any disclaimer, the term of this patent is extended or adjusted under 35 U.S.C. 154(b) by 490 days.

(21) Appl. No.: 15/580,051

(22) PCT Filed: Jun. 30, 2015

(86) PCT No.: PCT/US2015/038505
§ 371 (c)(1),
(2) Date: Dec. 6, 2017

(87) PCT Pub. No.: WO2017/003447
PCT Pub. Date: Jan. 5, 2017

(65) Prior Publication Data
US 2018/0135559 A1    May 17, 2018

(51) Int. Cl.
*F02K 9/52* (2006.01)
*F02K 9/68* (2006.01)
*B64G 1/40* (2006.01)
*F02K 9/58* (2006.01)
*F02K 9/94* (2006.01)
*F02K 9/97* (2006.01)

(52) U.S. Cl.
CPC ............... *F02K 9/52* (2013.01); *B64G 1/401* (2013.01); *B64G 1/402* (2013.01); *B64G 1/403* (2013.01); *F02K 9/58* (2013.01); *F02K 9/68* (2013.01); *F02K 9/94* (2013.01); *F02K 9/97* (2013.01); *F05D 2260/311* (2013.01)

(58) Field of Classification Search
CPC ..... F02K 9/68; F02K 9/52; F02K 9/60; C06D 5/04; C06B 47/08; C22C 1/0433
See application file for complete search history.

(56) References Cited

U.S. PATENT DOCUMENTS

| 3,298,182 A | 1/1967 | Webb |
| 3,303,651 A | 2/1967 | Grant, Jr. et al. |
| 3,310,938 A | 3/1967 | Adolphus |

(Continued)

FOREIGN PATENT DOCUMENTS

| DE | 10060768 | 6/2002 |
| JP | H01155607 | 6/1989 |

(Continued)

OTHER PUBLICATIONS

Vander Wall "Propellant/Material compatibility study" (Year: 1971).*

(Continued)

*Primary Examiner* — Arun Goyal
*Assistant Examiner* — William L Breazeal

(57) ABSTRACT

A catalytic thruster includes a reaction chamber that extends between first and second opposed chamber ends. The first chamber end includes a thermal standoff cup. There is a catalyst bed in the reaction chamber, and a feed tube extends into the reaction chamber through the thermal standoff cup.

12 Claims, 2 Drawing Sheets

(56) References Cited

U.S. PATENT DOCUMENTS

| | | | | |
|---|---|---|---|---|
| 4,069,664 A | * | 1/1978 | Ellion | F02K 9/68 |
| | | | | 422/607 |
| 5,568,723 A | * | 10/1996 | Burke | B01J 7/02 |
| | | | | 60/203.1 |

FOREIGN PATENT DOCUMENTS

| | | | | |
|---|---|---|---|---|
| JP | 2004156477 | | 6/2004 | |
| JP | 2009257155 | * | 11/2009 | F02K 9/52 |

OTHER PUBLICATIONS

Parker "The Preliminary Design and Status of a Hydrazine MilliNewton Thruster Development" (Year: 1999).*
MIT "Space Propulsion" (Year: 2016).*
International Preliminary Report on Patentability for International Application No. PCT/2015/038505 dated Jan. 17, 2018.
International Search Report for International Application No. PCT/US2015/038505 completed Mar. 14, 2016.

* cited by examiner

DUAL STAGE CATALYTIC THRUSTER

BACKGROUND

Catalytic thrusters are used on satellites and other space vehicles for adjusting vehicle position, for example. Such thrusters can include a chamber that holds a catalyst, and a feed tube for delivering propellant into the chamber. The propellant reacts in the presence of the catalyst to generate a gas that is expelled through a nozzle to generate thrust. Such vehicles may be utilized for many years, and over the life of the vehicle the thruster may be operated through many thousands of firing cycles and accumulate in excess of a million pulses.

SUMMARY

A catalytic thruster according to an example of the present disclosure includes a reaction chamber that extends between first and second opposed chamber ends. The first chamber end includes a thermal standoff cup, and there is a catalyst bed in the reaction chamber; with a feed tube that extends into the reaction chamber through the thermal standoff cup.

A further embodiment of any of the foregoing embodiments includes a sacrificial screen attached to an end of the feed tube and disposed within the catalyst bed.

A further embodiment of any of the foregoing embodiments includes a removable flow restrictor disposed within the feed tube adjacent the catalyst bed.

A further embodiment of any of the foregoing embodiments includes a cap attached to an end of the feed tube and disposed within the catalyst bed. The cap closes an orifice of the tube from the catalyst bed.

In a further embodiment of any of the forgoing embodiments, the thermal standoff cup has a frustum geometry.

In a further embodiment of any of the forgoing embodiments, the thermal standoff cup has a cylindrical geometry.

In a further embodiment of any of the forgoing embodiments, the flow restrictor includes a mesh, and the mesh is sized with respect to size of catalyst granules in the catalyst bed to block the catalyst granules from entering the at least one injector port.

In a further embodiment of any of the forgoing embodiments, the mesh is a sleeve disposed on the tube end.

A further embodiment of any of the foregoing embodiments includes a removable flow restrictor that partially blocks the at least one injection port. The flow restrictor is formed of an environmentally-non-resistant material that is consumable under controlled conditions in the reaction chamber to unblock at least one injection port, and the environmentally-non-resistant material is selected form the group consisting of Co-based alloys, Ni—Cr—Fe alloys, and W-based alloys. The environmentally-resistant material is elected from the group consisting of Ni—Cr—W alloys and Ni—Cr—Mo alloys.

In a further embodiment of any of the forgoing embodiments, the thermal standoff cup has a frustum geometry that is disposed about a central axis. The frustum includes a narrow bottom and sloped side wall that extends from the narrow bottom to a lip that defines a wide, open top, and the narrow bottom has a first radial dimension relative to the central axis that is approximately 3X and the wide top has a second radial dimension that is approximately 5X, wherein X is an average particle size of catalyst granules in the catalyst bed.

In a further embodiment of any of the forgoing embodiments, the feed tube extends a distance D1 into the reaction chamber. The distance D1 is defined from an inside surface of a narrow bottom of the thermal standoff cup where the feed tube enters to a tip of the feed tube in the reaction chamber. The reaction chamber is disposed about a central axis and has a radial dimension D2 relative to the central axis. A penetration ratio of the distance D1 to the radial dimension D2 is greater than or equal to 1:1.

In a further embodiment of any of the forgoing embodiments, the penetration ratio is less than or equal to 1.25:1.

A further embodiment of any of the foregoing embodiments includes a convergent-divergent nozzle at the second chamber end.

A further embodiment of any of the foregoing embodiments includes a removable flow restrictor that partially blocks the at least one injection port. The flow restrictor is formed of an environmentally-non-resistant material that is consumable under controlled conditions in the reaction chamber to unblock the at least one injection port. The feed tube is formed of an environmentally-resistant material, and the environmentally-non-resistant material and the environmentally-resistant material are, respectively, environmentally-non-resistant and environmentally-resistant with regard to nitrogen embrittlement.

In a further embodiment of any of the forgoing embodiments, the controlled conditions include a thrust cycle of the catalytic thruster.

A method of operating the catalytic thruster includes removing at least a portion of the flow restrictor, to unblock the at least one injection port, by operating the catalytic thruster under the controlled conditions for at least one thrust cycle of the catalytic thruster.

A further embodiment of any of the foregoing embodiments includes changing at least one of velocity and momentum of a propellant flowing from the at least one injection port into the reaction chamber by causing the environmentally-non-resistant material of the flow restrictor to be consumed under the controlled conditions.

In a further embodiment of any of the forgoing embodiments, the causing of the environmentally-non-resistant material to be consumed includes delivering propellant through the at least one injection port into the reaction chamber to produce the controlled conditions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
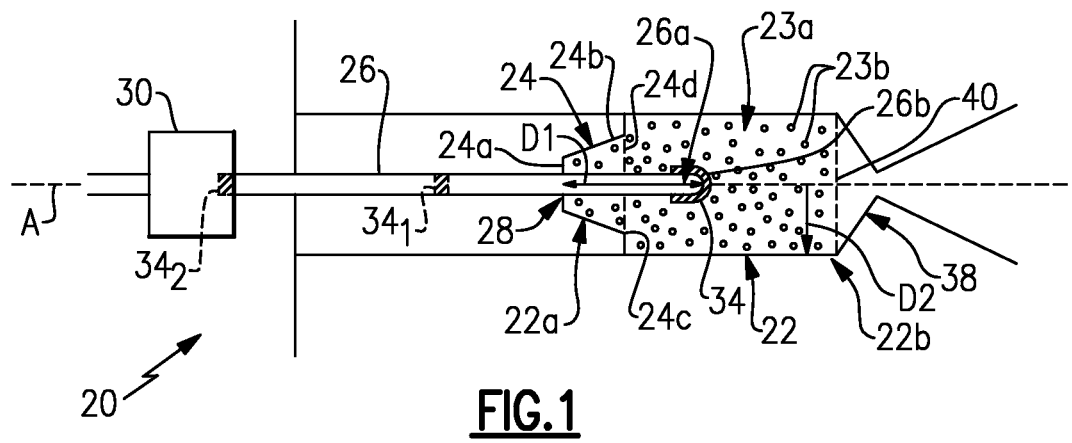
FIG. 1 illustrates an example catalytic thruster.

FIG. 1 schematically illustrates an example catalytic thruster 20 arranged along a central axis A. As will be described, the thruster 20 may include a combination of features related to materials, propellant flow management, and thermal management that together enhance overall durability.

The thruster 20 includes a housing or reaction chamber 22 that spans between first and second opposed chamber ends 22a/22b. The reaction chamber 22 contains a catalyst bed 23a of catalyst granules 23b that fill the volume within the reaction chamber 22. In this example, the reaction chamber 22 generally has an elongated cylindrical shape.

The first chamber end 22a includes a thermal standoff cup 24, which has a frustum geometry, disposed about central axis A, which is co-axial with the central axis of the thruster 20 in this example. The thermal standoff cup 24 includes a narrow bottom 24a and sloped sidewalls 24b that extend from the narrow bottom 24a to a cup lip 24c that defines a wide, open top 24d. In further examples, the thermal standoff cup 24 could have a different geometry, such as cylindrical, conical, spherical, or of compound curvature form.

A feed tube 26 extends through the thermal standoff cup 24 at a joint 28 and into the reaction chamber 22. For example, the joint 28 may be a bonded or brazed joint. The feed tube 26 includes a tube end 26a that has at least one injection port 26b that opens into the reaction chamber 22. In this example, the feed tube 26 includes a single, relatively large, injection port 26b that opens axially. The feed tube 26 is formed of an environmentally-resistant material, as will be discussed in more detail below. A control valve 30 at a forward portion of the feed tube 26 is operable to control flow of liquid propellant through the feed tube 26.

The thermal standoff cup 24 mechanically supports the feed tube 26. For example, the sloped sidewalls 24b of the thermal standoff cup 24 can be made relatively thin, to provide compliant support of the feed tube 26. In a further example, the thermal standoff cup 24 is shaped with respect to the catalyst granule 23b size. For instance, the narrow bottom 24a has a first radial dimension relative to the central axis A that is approximately 3X, and the wide top 24d has a second radial dimension that is approximately 5X, wherein X is the average particle size of the catalyst granules 23b.

Figure 2A:
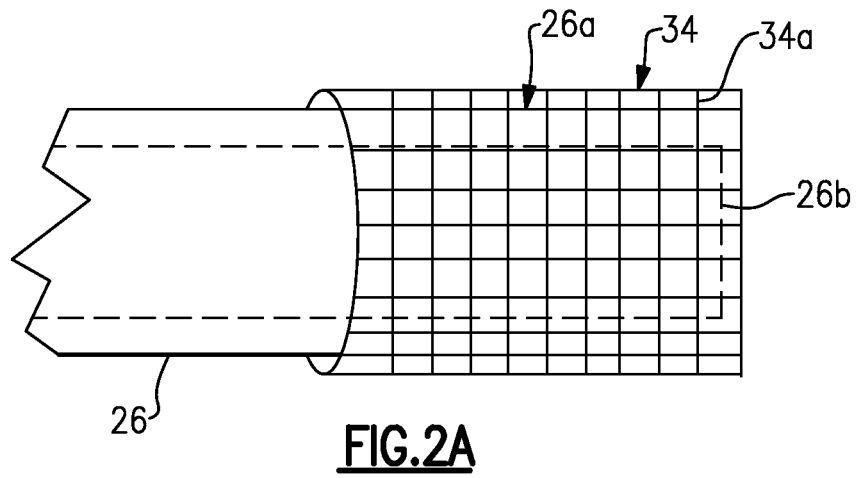
FIG. 2A is an isolated view of a feed tube end that has a flow restrictor, prior to any thruster operation.

Referring also to FIG. 2A, which shows an isolated view of the tube end 26a, a removable flow restrictor 34 partially blocks the one or more injection ports 26b. As will also be described in further detail, the removable flow restrictor 34 is formed of an environmentally-non-resistant material that is consumable, or sacrificial, under controlled conditions in the reaction chamber 22 to unblock the one or more injection ports 26b.

The thruster 20 further includes a convergent-divergent nozzle 38 located at the second chamber end 22b. A slotted retention plate 40 is situated at the second chamber end 22b, to retain the catalyst granules 23b in the reaction chamber 22 but permit gas flow there through.

In operation, the control valve 30 controls flow of the propellant, such as but not limited to hydrazine, through the feed tube 26 and from the injector opening 26b into the reaction chamber 22. The propellant decomposes in the presence of the catalyst granules 23b to generate a hot gas that is expelled through the slots of the slotted retention plate 40 and then through the nozzle 38 to generate thrust in a known manner by reducing static pressure and accelerating the gas.

Prior to any firing of the thruster 20, such as during delivery, handling, or installation of the thruster 20, the catalyst granules 23b are small enough to migrate through the injection port 26b, but for the removable flow restrictor 34. If migration were to occur, the catalyst granules 23b may move upstream to the control valve 30. During and after thruster 20 installation onto a spacecraft, the control valve 30 may be actuated to verify function. The catalyst granules 23b could potentially prevent the control valve 30 from sealing properly and undesirably permit fuel to pass. In this regard, the removable flow restrictor 34 serves to block the catalyst granules 23b from entering into the injection port 26b. That is, the injection port 26b can be larger than the catalyst granules 23b because of the presence of the removable flow restrictor 34.

Additionally, the thruster 20 as described includes features for managing heat generated from the decomposition of the propellant in the presence of the catalyst granules 23b. For example, the thermal standoff cup 24 serves to displace the joint 28 from the tube end 26a of the feed tube 26 and thus displace the joint 28 from the primary reaction zone around the tube end 26a. Such displacement (i) lengthens the thermal conduction path from the reaction zone to the joint 28 and (ii) locates the tube end 26a far enough from the joint 28 that the propellant generally does not contact the thermal standoff cup 24 or walls of the reaction chamber 22. The lengthening of the thermal conduction path serves as a thermal "resistor" to thermally isolate the joint 28. The avoidance of propellant contact with the thermal standoff cup 24 or walls of the reaction chamber 22 reduces the potential for thermal decomposition of the propellant from heating by these structures. Such thermal decomposition may yield pressure events that can potentially break the catalyst granules 23b. Broken catalyst granules 23b could be expelled from the catalyst bed 23a out of the nozzle 38 and form a void area in the catalyst bed 23a where propellant could pool and contribute to additional pressure events. Additionally, without such displacement, a joint would be exposed to a higher temperature at each thruster firing cycle, over thousands of cycles, which could potentially lead to higher thermal stress and thermal stress cyclic amplitude. The location of the tube end 26a far from the joint 28 also lowers temperatures at the joint 28, thereby causing lower thermal stress and less low cycle fatigue. Less fatigue cracking results in longer life for the product.

In further examples, the displacement is represented by a degree of penetration of the feed tube 26 into the reaction chamber 22, relative to the size of the reaction chamber 22. A feed tube that penetrates far is a "deep-penetrating" tube. As shown in FIG. 1, the feed tube 26 extends a distance D1 into the reaction chamber 22. The distance D1 is the linear length from an inside surface of a narrow bottom 24a of the thermal standoff cup 24 where the feed tube 26 enters to a tip of the feed tube 26 in the reaction chamber 22.

The size of the reaction chamber 22 is represented by a radial dimension D2 of the reaction chamber 22 with respect to the central longitudinal axis A. For example, the working relationship between the values D1 and D2 is represented by a penetration ratio of D1:D2. In one example, the penetration ratio is greater than or equal to 1:1. In further examples, the penetration ratio is also less than or equal to 1.25:1.

Figure 2B:
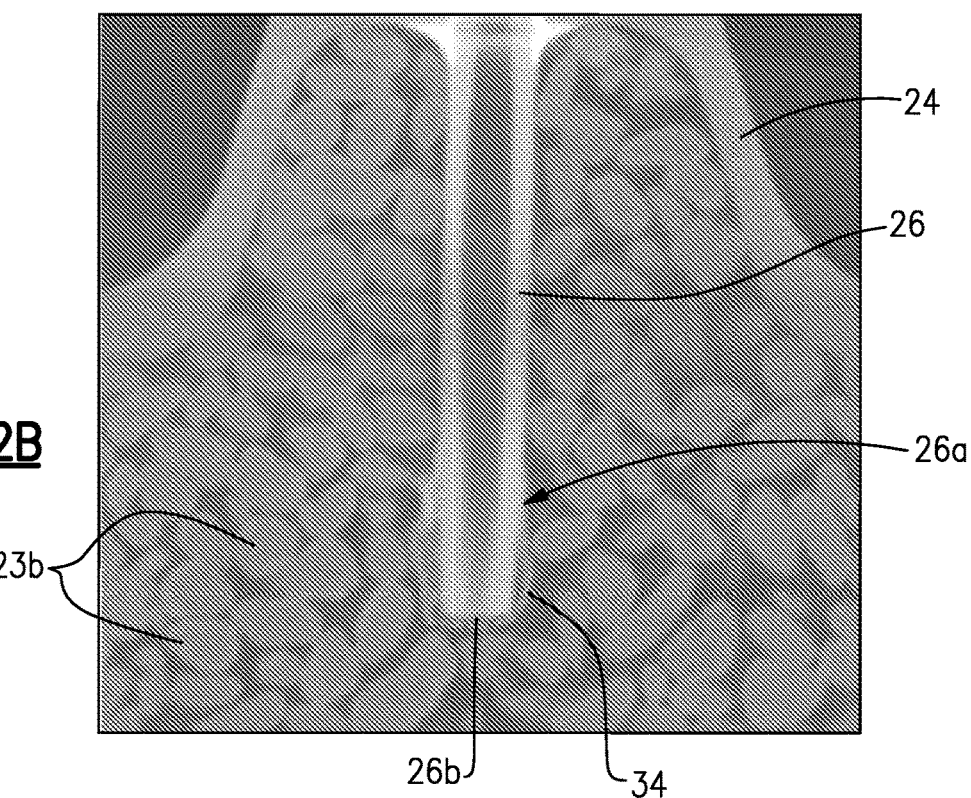
FIG. 2B is a Computed Tomography image of a feed tube end and flow restrictor prior to any thruster operation.

FIG. 2A schematically illustrates the tube end 26a of the feed tube 26 prior to any thruster operation. FIG. 2B shows a Computed Tomography image of an example of the tube end 26a and removable flow restrictor 34 prior to any thruster operation. The removable flow restrictor 34 at least partially blocks the injection port 26b. For example, the removable flow restrictor 34 is a cap, such as sacrificial wire screen or mesh sleeve that includes a grid of metal wires 34a. The cap or sleeve is fit over the tube end 26a and can be attached thereto, such as by friction-fit or brazing. For example, the mesh is sized with respect to the size of the catalyst granules 23b in the catalyst bed 23a such that the mesh blocks the catalyst granules 23b, and potentially broken pieces of the granules, from entering the injection port 26b. That is, the openings between the metal wires 34a are smaller than the size of the catalyst granules 23b. One example mesh size is 200 mesh, but the selected size will depend on the selected size of the catalyst granules 23b.

Alternatively, rather than locating the removable flow restrictor 34 at the tube end 26a, the removable flow restrictor could be located within the feed tube 26 adjacent the catalyst bed 23, as represented at $34_1$, or in the control valve 30, as represented at $34_2$. The function of flow restrictor $34_1$ or $34_2$ would be the same if in these alternate locations, to block migration of the catalyst granules 23b into the valve seat of the control valve 30.

Initially, prior to any operation of the thruster 20, the mesh of the removable flow restrictor 34 partially blocks, or closes, the injection port 26b and thus restricts initial flow of the propellant from the injection port 26b. However, the removable flow restrictor 34 is formed of an environmentally-non-resistant material that is consumed or sacrificed under the controlled operating conditions of use in the thruster 20 and reaction chamber 22. Under such controlled operating conditions, the environmentally-non-resistant material is consumed and the flow restrictor 34 "sheds" from the feed tube 26 to expose, and thus unblock, the injection port 26b.

Figure 3A:
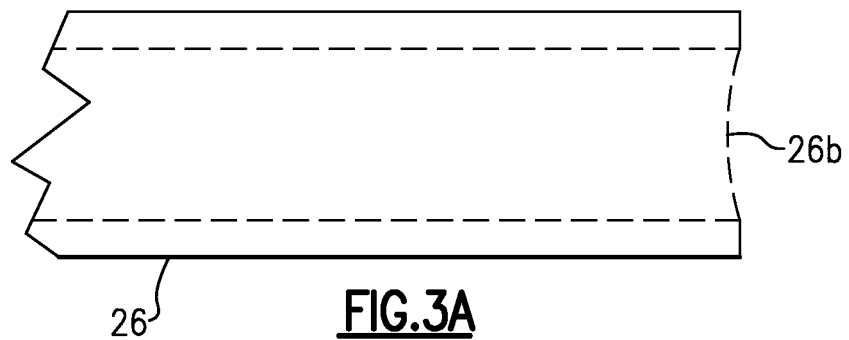
FIG. 3A is an isolated view of a feed tube end after thruster operation to remove the flow restrictor.
Figure 3B:
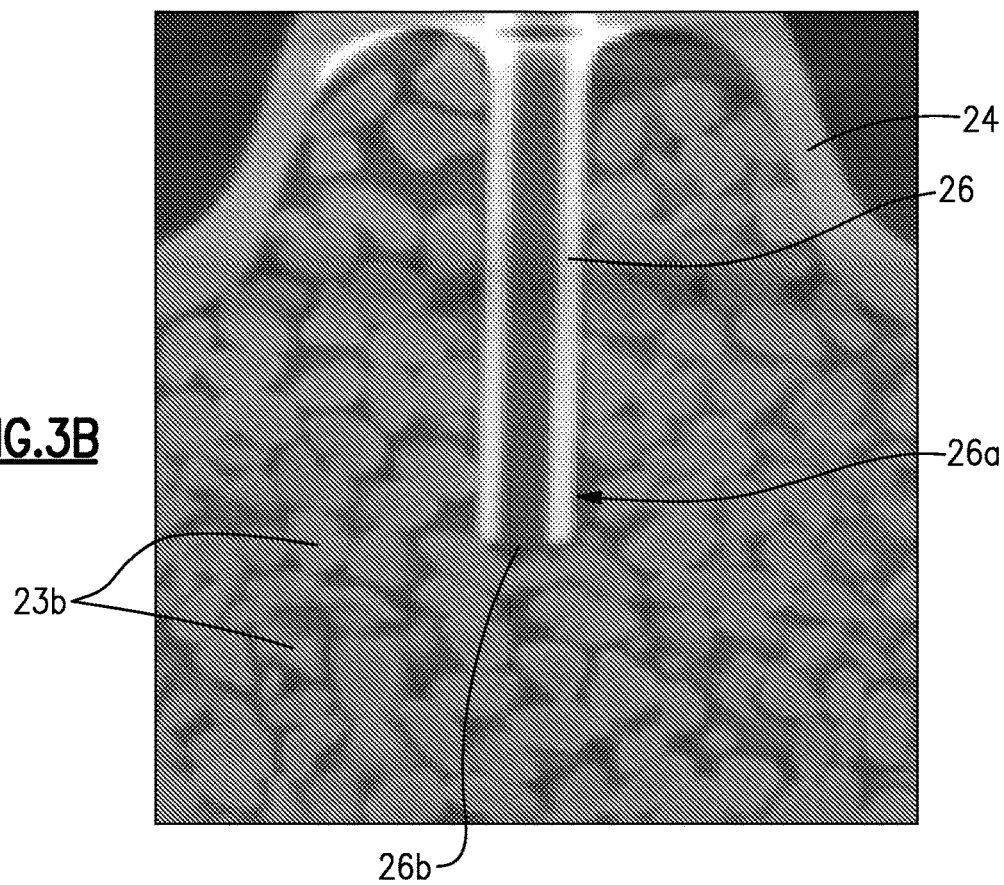
FIG. 3B is a Computed Tomography image of a feed tube end after thruster operation to remove the flow restrictor.

FIG. 3A schematically illustrates an isolated view of the tube end 26a of the feed tube 26 after thruster 20 operation under the controlled conditions, and FIG. 3B shows a Computed Tomography image of an example of the tube end 26a after thruster 20 operation under the controlled conditions. In these examples, the flow restrictor 34 has been fully consumed and shed (removed), thus fully exposing the injection port 26b.

The environmentally-non-resistant material can be selected with regard to the controlled conditions in the environment within the reaction chamber 22. For instance, the controlled conditions include the temperature and gaseous environment produced during firing of the thruster 20. In one example, the exhaust gas temperature is over 2000° F. and the gas composition is primarily nitrogen. In one further example, the composition is majority nitrogen, with ammonia and hydrogen. In one further example, the composition is approximately 64% nitrogen, approximately 28% ammonia, and approximately 8% hydrogen.

For example, the environmentally-non-resistant material is selected from Co-based alloys, Ni—Cr—Fe alloys and tungsten (W), which can be in the form of a W-based alloy or pure or substantially pure W. These materials are susceptible, or at least more susceptible, to environmental degradation in the operating conditions in the thruster 20 than the materials of the other components of the thruster 20, such as the feed tube 26.

Further examples of the environmentally-non-resistant material include alloys known as HAYNES® 25 and INCONEL® 600, the compositions of which are known and incorporated herein by reference. While such materials are conventionally known as high performance materials, these materials are implemented in this disclosure in a sacrificial capacity as a low environment-resistant material relative to the resistance of the material of the feed tube 26, for example.

In contrast, the feed tube 26 is formed of an environmentally-resistant material. For example, the environmentally-resistant material is selected from Ni—Cr—W alloys and Ni—Cr—Mo alloys. Further examples of the environmentally-resistant material include alloys known as HAYNES® 230 and INCONEL® 625, the compositions of which are known and incorporated herein by reference.

The environmentally-non-resistant materials herein are susceptible to environmental attack, such as absorption of nitrogen that can lead to nitrogen embrittlement, while the environmentally-resistant materials herein are less susceptible to such absorption and embrittlement. Thus, under the controlled operating conditions in the reaction chamber 22, the environmentally-non-resistant material of the flow restrictor 34 degrades, while the environmentally-resistant material of the feed tube 26 does not degrade, or at least degrades at a significantly lower rate. In further examples, the resistance, or lack thereof, of the materials can be represented by nitrogen absorption data. For example, the nitrogen absorption of the environmentally-resistant material is less than half of the nitrogen absorption of the environmentally-non-resistant material. In another example, in exposure to a nitrogen test solution, approximately 1% of the wall thickness of the environmentally resistant material embrittles, while under the same condition 100% of the wall thickness of a non-environmentally-resistant material embrittles.

The environmentally-non-resistant material degrades and embrittles under the controlled conditions such that the flow restrictor 34 fractures and sheds from the feed tube 26 under the forces of the flowing propellant, pressure forces in the reaction chamber 22, thermal forces, or any combination thereof. The unblocked injection port 26b is thus then able to provide unrestricted flow of the propellant into the reaction chamber 22. Compared to the initial, partially blocked flow of propellant through the flow restrictor 34, the unblocked or unrestricted flow of the propellant once the flow restrictor 34 has been removed is a lower velocity (increased flow area for the same flow rate reduces velocity) and higher momentum flow. The lower velocity flow enhances durability of the catalyst granules 23b by reducing the potential for fracture of the catalyst granules 23b that can occur from impact of higher velocity propellant flow. In turn, the low velocity, high momentum flow can potentially increase the life capability and reduce performance degradation of the thruster 20.

The combination of the thermal standoff cup 24, the flow restrictor 34 formed of the environmentally-non-resistant material, and the environmentally-resistant material of the feed tube 26 can enhance overall durability of the thruster 20. For instance, the thermal standoff cup 24 displaces the joint 28 from the reaction zone, as discussed above, thus reducing the temperature at the bonded joint 28. The flow restrictor 34 blocks infiltration of the catalyst granules 23b into the injection port 26b, yet sheds under the controlled conditions to unblock the injection port 26b to permit the lower velocity and higher momentum flow that would otherwise not be available with a permanent flow restrictor. In this regard, the injection port 26b can be relatively large to achieve the lower velocity and higher momentum flow. The material of the feed tube 26 is environmentally-resistant relative to the environmentally-non-resistant material of the flow restrictor 34. Thus, while the flow restrictor 34 can readily be shed under the conditions, the feed tube 26 is much less susceptible to degradation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A catalytic thruster comprising:
   a reaction chamber that extends between a first chamber end and a second chamber end, the first chamber end including a thermal standoff cup;
   a catalyst bed in the reaction chamber, the thermal standoff cup bounding the catalyst bed;
   a feed tube that extends into the reaction chamber through the thermal standoff cup, the feed tube includes a tube end that has at least one injection port that opens into the reaction chamber; and
   a sacrificial flow restrictor that partially blocks the at least one injection port, wherein the sacrificial flow restrictor is formed of a material that degrades and sheds from the at least one injection port upon operation of the catalytic thruster,
   the feed tube extending a distance D1 into the reaction chamber, the distance D1 being defined from an inside surface of a narrow bottom of the thermal standoff cup where the feed tube enters to a tip of the feed tube in the reaction chamber, the reaction chamber is disposed about a central axis and has a radial dimension D2 relative to the central axis, and a penetration ratio of the distance D1 to the radial dimension D2 is greater than or equal to 1:1.

2. The catalytic thruster as recited in claim 1, wherein the sacrificial flow restrictor is a screen attached to an end of the feed tube and disposed within the catalyst bed.

3. The catalytic thruster of claim 1, wherein the sacrificial flow restrictor is disposed within the feed tube adjacent the catalyst bed.

4. The catalytic thruster of claim 1, wherein the thermal standoff cup has a frustum geometry.

5. The catalytic thruster of claim 1, wherein the thermal standoff cup has a cylindrical geometry.

6. The catalytic thruster as recited in claim 1, wherein the sacrificial flow restrictor includes a mesh, and the mesh is sized with respect to size of catalyst granules in the catalyst bed to block the catalyst granules from entering the at least one injector port.

7. The catalytic thruster as recited in claim 6, wherein the mesh is a sleeve disposed on the tube end.

8. The catalytic thruster as recited in claim 1, further comprising a convergent-divergent nozzle at the second chamber end.

9. The catalytic thruster as recited in claim 1, wherein the operation include a single thrust cycle of the catalytic thruster.

10. The catalytic thruster as recited in claim 1, wherein the penetration ratio is also less than or equal to 1.25:1.

11. The catalytic thruster as recited in claim 10, wherein the feed tube is bonded in a joint with the thermal standoff cup.

12. The catalytic thruster as recited in claim 1, wherein the feed tube and the sacrificial flow restrictor are formed of different alloys.

* * * * *